(12) United States Patent
Honda (10) Patent No.: US 7,082,018 B2
(45) Date of Patent: Jul. 25, 2006

(54) POWER SUPPLY APPARATUS IN ELECTRIC VEHICLE

(75) Inventor: Satoshi Honda, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 227 days.

(21) Appl. No.: 10/646,697

(22) Filed: Aug. 25, 2003

(65) Prior Publication Data

US 2004/0056616 A1 Mar. 25, 2004

(30) Foreign Application Priority Data

Aug. 28, 2002 (JP) ............................... 2002-249310

(51) Int. Cl.
*H02H 7/00* (2006.01)
(52) U.S. Cl. ........................................................ 361/18
(58) Field of Classification Search .................. 361/18
See application file for complete search history.

(56) References Cited

U.S. PATENT DOCUMENTS 3,989,990 A * 11/1976 Thompson ................... 318/139
5,931,245 A * 8/1999 Uetake et al. ............. 180/65.8

FOREIGN PATENT DOCUMENTS

JP 05049101 A 2/1993

* cited by examiner

*Primary Examiner*—Stephen W. Jackson
(74) *Attorney, Agent, or Firm*—Birch, Stewart, Kolasch & Birch, LLP (57) ABSTRACT

A power supply apparatus for stabilizing a voltage generated on a power supply line by an electric motor, for preventing a battery from being overcharged, preventing an overvoltage from being generated, and protecting system components from an overvoltage, even when a battery is removed or no electric power is supplied from the battery to a control means. The apparatus includes a drive circuit for energizing a permanent-magnet brushless motor and a control circuit for controlling the drive circuit. A power supply state detecting circuit (activating unit) activates the control circuit depending on a voltage value on a power supply line of the motor. A voltage stabilizing means including a relay and a regenerative resistor stabilizes the voltage on the power supply line when the relay is opened and closed under the control of the control circuit. The voltage stabilizing means may include the drive circuit.

20 Claims, 8 Drawing Sheets

POWER SUPPLY APPARATUS IN ELECTRIC VEHICLE

CROSS-REFERENCE TO RELATED APPLICATION

The present application claims priority under 35 USC 119 to Japanese Patent Application No. 2002-249310 filed on Aug. 28, 2003, the entire contents thereof is hereby incorporated by reference.

BACKGROUND OF THE INVENTION

1. Field of the Invention

The present invention relates to a power supply apparatus in an electric vehicle such as a motor driven scooter, or the like. More particularly the present invention relates to a power supply apparatus in an electric vehicle for stabilizing a voltage generated on a power supply line by an electric motor, preventing a battery from being overcharged, preventing an overvoltage from being generated, and protecting system components from an overvoltage, even when no electric power is supplied from the battery to a control means for controlling the energization of the electric motor or the battery is removed.

2. Description of Background Art

Motor driven scooters have an electric motor for rotating an axle, e.g., a permanent-magnet brushless motor, and a power supply apparatus for energizing the electric motor with electric power supplied from a battery. The power supply apparatus has a regenerating function to operate the electric motor as a generator and charge the battery with electric power generated thereby when the motor driven scooter is running by inertia or running downhill. The power supply apparatus also has a function to stabilize a voltage on a power supply line which supplies electric power to the electric motor.

Japanese patent Laid-open No. Hei 5-49101 discloses a vehicle power supply protection circuit for preventing a power supply device on a vehicle from being overloaded. The vehicle power supply protection circuit has a controller for controlling the supply of electric power to a load depending on a voltage across the terminals of a battery. Specifically, the voltage across the terminals of the battery, which is charged by regenerative power from a rotary machine operating as a starter, is monitored by a control circuit. If the voltage across the terminals of the battery exceeds a reference value, then the electric power from the battery is supplied via an inverter circuit to the load (such as in a refrigerator, or the like). If the voltage across the terminals of the battery is equal to or lower than the reference value, then the inverter circuit is de-energized to prevent the battery from being overly discharged.

On electric vehicles, there is a possibility for the battery to be removed or for a switch for supplying electric power from the battery to the electric motor to be turned off intentionally during long downhill driving. When the battery is removed or the switch is turned off, the voltage on the power supply line is not stabilized and increases, thus making it difficult to protect components (FETs, etc.) of the power supply apparatus.

In the vehicle power supply protection circuit disclosed in Japanese patent Laid-open No. Hei 5-49101, the control circuit is supplied with electric power from the battery at all times. The control circuit is not designed to prepare for the situation when the battery is removed or the switch is turned off. Therefore, it is difficult to solve the above problems even if the disclosed arrangement is applied to an electric vehicle.

There has been a demand for a power supply apparatus for an electric vehicle which is arranged to stabilize a voltage on a power supply line and prevent an overvoltage from being generated on the power supply line even when a battery on the electric vehicle is removed or the electric vehicle is driven with the switch turned off.

SUMMARY AND OBJECTS OF THE PRESENT INVENTION

The present invention has been made in view of the above demand. It is an object of the present invention to provide a power supply apparatus in an electric vehicle for stabilizing a voltage generated on a power supply line by an electric motor and protecting system components from overcharging of a battery and a generated overvoltage, even when no electric power is supplied from the battery to a control means, or when the battery is removed.

To solve the above problems, in accordance with a first feature of the present invention a power supply apparatus in an electric vehicle having drive means for energizing an electric motor and control means for controlling the drive means is provided with an activating unit for activating the control means depending on a voltage value on a power supply line of the electric motor, and voltage stabilizing means for stabilizing a voltage on the power supply line according to an instruction from the control means.

According to a second feature of the present invention, the voltage stabilizing means includes a regenerative resistor disposed between the power supply line and a ground line with a switch connected thereto, and the control means controls the opening and closing of the switch.

According to a third feature of the present invention, the voltage stabilizing means includes the drive means, and the control means controls the drive means to stabilize the voltage on the power supply line.

According to the first feature, the control means is activated by the activating unit, even when no electric power is supplied from the battery to the control means, or when the battery is removed. Therefore, when no electric power is supplied from the battery to the control means or the battery is removed, the voltage on the power supply line, which is generated by the electric motor, is stabilized, and system components are protected from a generated overvoltage.

According to the second feature, the voltage on the power supply line can be stabilized when the control means closes the switch to connect the regenerative resistor.

According to the third feature, the voltage on the power supply line can be stabilized when the control means controls the drive means to stabilize the voltage on the power supply line.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIOPTION OF THE PREFERRED EMBODIMENTS

Figure 1:
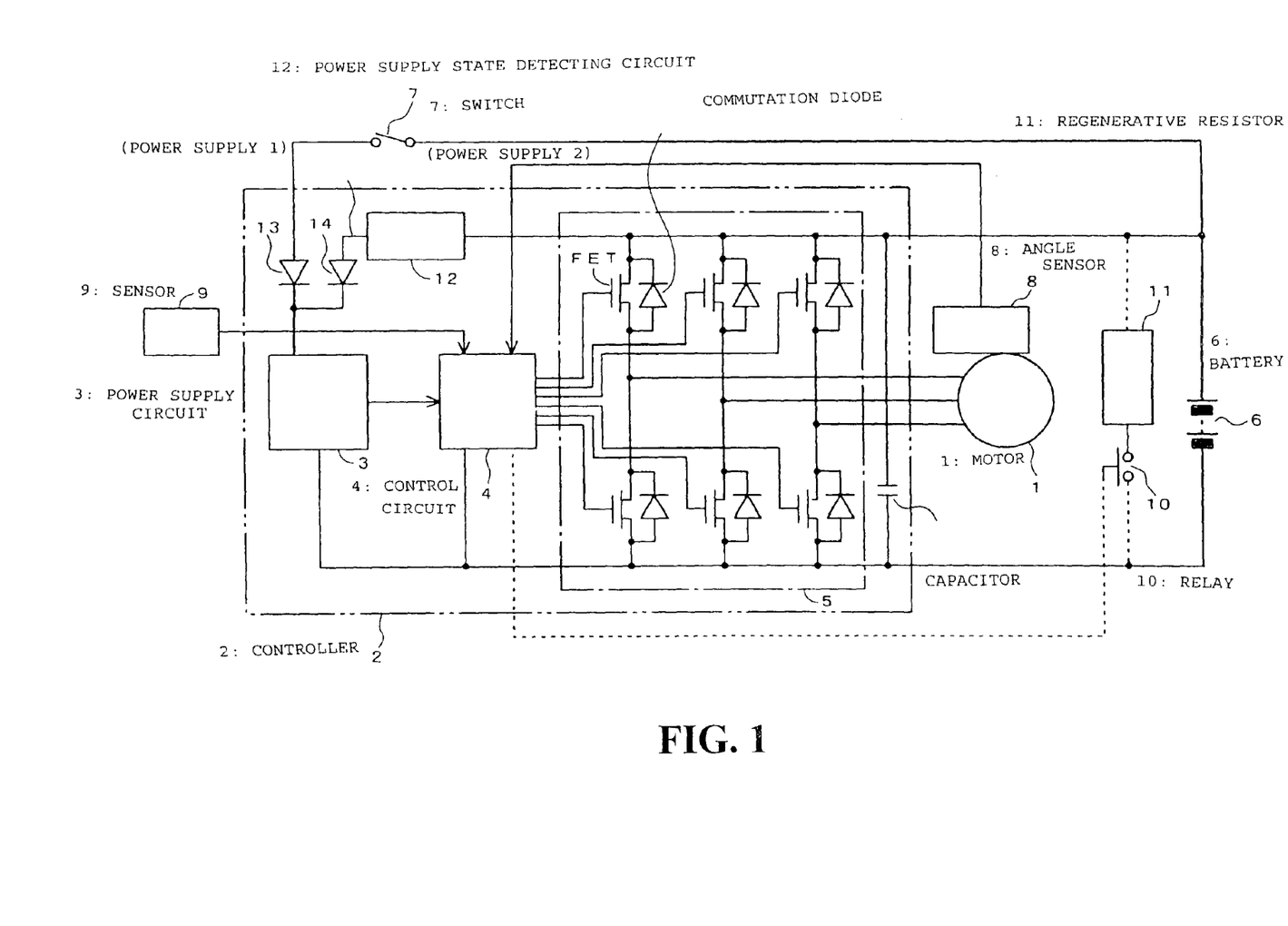
FIG. 1 is a block diagram of an embodiment of a power supply apparatus for an electric vehicle to which the present invention is applied.

FIG. 1 is a block diagram of an embodiment of a power supply apparatus for an electric vehicle to which the present invention is applied. The power supply apparatus according to the present embodiment has a controller 2 for energizing a permanent-magnet brushless motor 1. The controller 2 has a power supply circuit 3, a control circuit 4, and a drive circuit 5. A switch 7 functions as a power supply switch for supplying electric power to the controller 2. When the switch 7 is turned on, electric power from a battery 6 is supplied through the switch 7, a diode 13, and the power supply circuit 3 to the control circuit 4, activating the control circuit 4.

The drive circuit 5 constitutes pairs of FETs and commutation diodes that are connected in a bridge. The control circuit 4 selectively energizes the FETs of the drive circuit 5 according to an output signal from an angle sensor 8 which detects an angular displacement of the motor 1, and controls currents of the FETs according to an output signal from an output command sensor 9 to produce a motor output instructed by the output signal from the output command sensor 9. A relay 10 and a regenerative resistor 11 serve to prevent the battery 6 from being overcharged when the motor 1 functions as a generator.

A power supply state detecting circuit 12 connected to a power supply line of the motor 1 functions as an activating unit for activating the control circuit 4 depending on a voltage value on the power supply line. Diodes 13, 14 serve to prevent currents from flowing back.

Operation of the power supply apparatus at the time the battery 6 is installed will be described below. When the switch 7 is turned on, electric power from the battery 6 is supplied through the switch 7, the diode 13, and the power supply circuit 3 to the control circuit 4, which is then activated. The control circuit 4 selectively energizes the FETs of the drive circuit 5 according to an output signal from the angle sensor 8, which detects an angular displacement of the motor 1. The control circuit 4 controls currents of the FETs according to an output signal from the output command sensor 9, which detects an action of the rider on the electric vehicle, thereby to produce a motor output instructed by the output signal from the output command sensor 9. As a result, the motor 1 is energized according to the action of the rider, propelling the electric vehicle.

When the electric vehicle is running by inertia or running downhill, the motor 1 operates as a generator in a so-called regenerative mode. When in the regenerative mode, electric power generated by the motor 1 is rectified by the commutation diodes of the drive circuit 5, which act as rectifying diodes, and is supplied to the battery 6, thus charging the battery 6.

When the battery 6 is fully charged and the voltage on the power supply line becomes excessive, the control circuit 4 stabilizes the voltage on the power supply line, preventing the battery 6 from being overcharged. Even if the switch 7 is turned off intentionally when the electric vehicle is running by inertia or running downhill, since the overvoltage on the power supply line is detected by the power supply state detecting circuit 12, and the control circuit 4 is supplied with electric power via the power supply state detecting circuit 12, the diode 14, and the power supply circuit 3, the voltage on the power supply line is continuously stabilized.

As described above, even if the switch 7 is turned off, the control circuit 4 is supplied with and activated by electric power via the power supply state detecting circuit 12, the diode 14, and the power supply circuit 3, thus stabilizing the voltage on the power supply line and preventing the battery 6 from being overcharged. The voltage on the power supply line is stabilized by reducing the currents of the FETs of the drive circuit 5 to weaken the magnetic field of the motor 1 for thereby reducing the amount of electric power generated thereby, turning on the relay 10 to connect the regenerative resistor 11 to allow a current to flow through the regenerative resistor 11, or applying a short brake or employing a combination of these actions.

Operation of the of the power supply apparatus at the time the battery 6 is removed will be described below. The process of stabilizing the voltage on the power supply line at this time is basically the same as process of stabilizing the voltage on the power supply line at the time the batter 6 is installed. Specifically, an overvoltage on the power supply line when the electric vehicle is running by inertia or running downhill with the battery 6 removed, is detected by the power supply state detecting circuit 12, and the control circuit 4 is supplied with electric power via the power supply state detecting circuit 12, the diode 14, and the power supply circuit 3.

Even if the battery 6 is removed, the control circuit 4 is supplied with and activated by electric power via the power supply state detecting circuit 12, thus stabilizing the voltage on the power supply line and protecting system components from the generated overvoltage.

Figure 2:
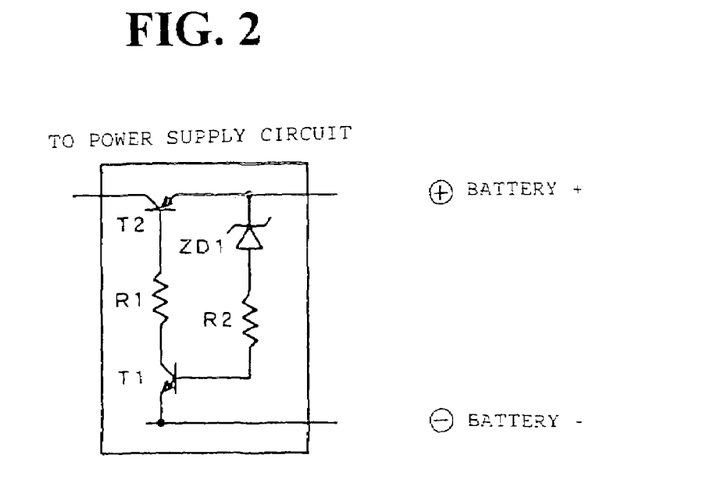
FIG. 2 is a circuit diagram of an embodiment of a power supply state detecting circuit.

FIG. 2 is a circuit diagram of an embodiment of the power supply state detecting circuit 12. The present embodiment includes an power supply state detecting circuit 12 which connects the power supply line to the power supply circuit when the voltage on the power supply line becomes equal to or higher than a certain value (overvoltage). The power supply state detecting circuit includes transistors T1, T2, a zener diode ZD1, and resistors R1, R2. An overvoltage setting is substantially determined by the zener voltage of the zener diode ZD1.

When the voltage on the power supply line becomes equal to or higher than an overvoltage setting that is substantially determined by the zener voltage of the zener diode ZD1, the transistor T1 is turned on and then the transistor T2 is turned on, connecting the power supply line to the power supply circuit 3.

Figure 3:
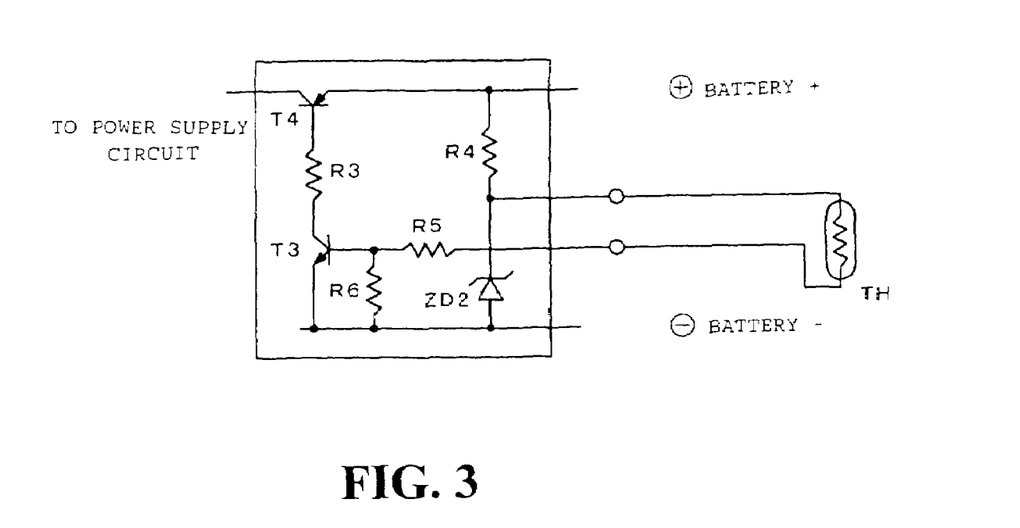
FIG. 3 is a circuit diagram of another example of the power supply state detecting circuit.

FIG. 3 is a circuit diagram of another example of the power supply state detecting circuit 12. The present embodiment includes a battery overvoltage detecting circuit which connects the power supply line to the power supply circuit depending on the voltage value on the power supply line and an overcharged state of the battery 6. The battery overvoltage detecting circuit constitutes transistors T3, T4, a zener diode ZD2, a battery temperature sensor TH such as a temperature-dependent resistor, and resistors R3 through R6. With the battery overvoltage detecting circuit, the voltage value on the power supply line for turning on the transistor T3 and hence the transistor T4 is not constant, but is variable depending on the temperature of the battery 6.

When the battery 6 is overcharged, its charging efficiency is lowered and its temperature rises, and the resistance of the battery temperature sensor TH is reduced. Therefore, the transistors T3, T4 are turned on by a voltage value which is lower than the voltage value on the power supply line. The battery overvoltage detecting circuit is capable of reliably preventing an overvoltage on the power supply line and also preventing the battery from being overcharged. The zener diode ZD2 serves to protect the transistor T3 and the battery temperature sensor TH from an overvoltage higher than a certain value.

Figure 4:
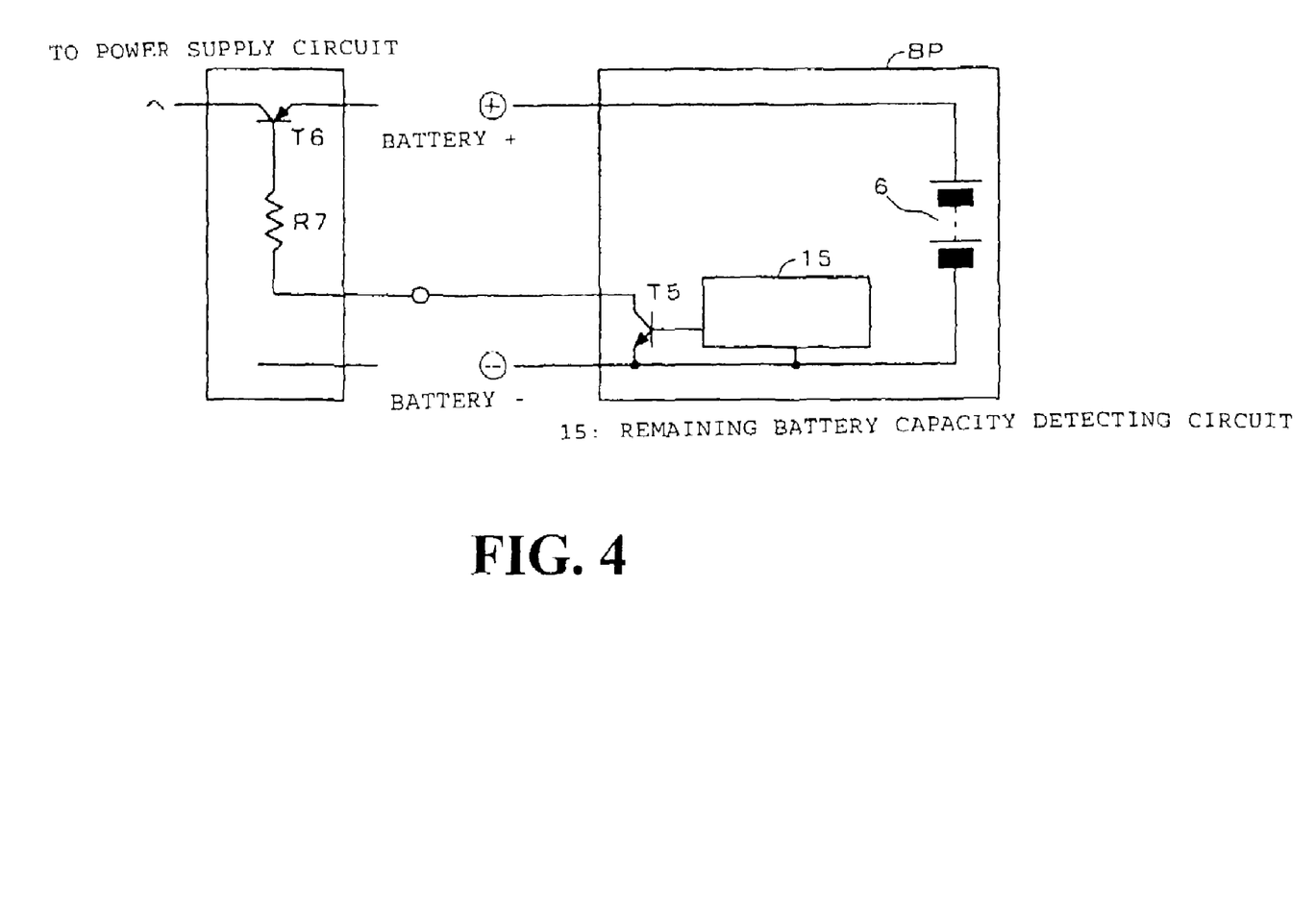
FIG. 4 is a circuit diagram of still another example of the power supply state detecting circuit.

FIG. 4 is a circuit diagram of still another example of the power supply state detecting circuit 12. The present embodiment includes a battery full-charge detecting circuit for detecting a fully charged state of the battery 6 with a remaining battery capacity detecting circuit 15 incorporated in a battery pack BP and connecting the power supply line to the power supply circuit 3 depending on the detected fully charged state of the battery 6.

The battery pack BP incorporates therein the battery 6, the remaining battery capacity detecting circuit 15, and a transistor T5 which is turned on when the remaining battery capacity detecting circuit 15 detects the fully charged state of the battery 6. When the remaining battery capacity detecting circuit 15 detects the fully charged state of the battery 6, the transistor T5 is turned on, turning on a transistor T6 whose base is connected to the collector of the transistor T5 through a resistor R7 thereby to connect the power supply line to the power supply circuit 3. The remaining capacity of the battery 6 can be detected by integrating charged and discharged power quantities of the battery 6.

The power supply state detecting circuits shown in FIGS. 2 through 4 can be used singly or in combination.

Figure 5:
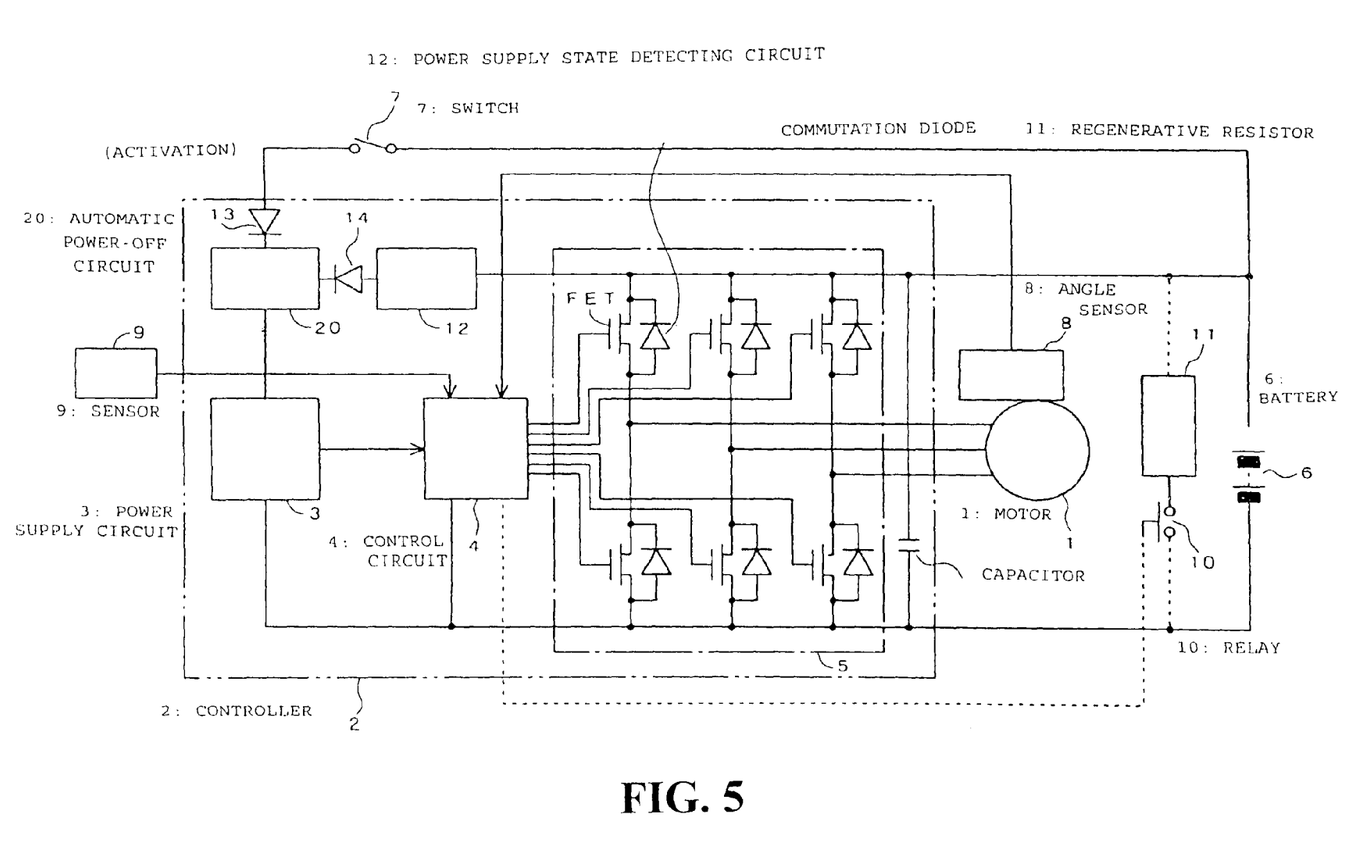
FIG. 5 is a block diagram of another embodiment of a power supply apparatus to which the present invention is applied.

FIG. 5 is a block diagram of another embodiment of a power supply apparatus to which the present invention is applied. Reference characters in FIG. 5 which are identical to those shown in FIG. 1 represent identical or equivalent components. The present embodiment differs from the embodiment shown in FIG. 1 in that the switch 7 is connected to an automatic power-off circuit 20 through the diode 13, the power supply state detecting circuit 12 is connected to the automatic power-off circuit 20 through the diode 14, and the automatic power-off circuit 20 has an output terminal connected to the input terminal of the power supply circuit 3. The power supply state detecting circuit 12 functions as an activating unit for activating the control circuit 4 depending on the voltage value on the power supply line of the motor 1.

When the switch 7 is turned on, the automatic power-off circuit 20 automatically cuts off the supply of electric power to the power supply circuit 3 under certain conditions. When the automatic power-off circuit 20 is supplied with a signal from the power supply state detecting circuit 12 in the automatic power-off mode, the automatic power-off circuit 20 supplies electric power to the power supply circuit 3 again.

When the switch 7 is turned on while the battery 6 is being installed, the automatic power-off circuit 20 is triggered by the switch 7 to supply electric power to the power supply circuit 3, activating the control circuit 4 with electric power supplied from the power supply line (connected to the positive terminal of the battery 6) through the switch 7, the diode 13, the automatic power-off circuit 20, and the power supply circuit 3. The control circuit 4 selectively energizes the FETs of the drive circuit 5 according to an output signal from the angle sensor 8, which detects an angular displacement of the motor 1. The control circuit 4 controls currents of the FETs according to an output signal from the output command sensor 9, which detects an action of the rider, thereby to produce a motor output instructed by the output signal from the output command sensor 9.

When the electric vehicle is running by inertia or running downhill, the motor 1 operates as a generator in a so-called regenerative mode. When in the regenerative mode, electric power generated by the motor 1 is supplied to the battery 6 through the drive circuit 5, thus charging the battery 6.

When the switch 7 is turned on and the electric vehicle is in the automatic power-off mode, if an overvoltage is developed on the power supply line with the battery 6 fully charged and the electric vehicle running by inertia or running downhill, then the power supply state detecting circuit 12 detects the overvoltage and outputs a trigger signal to the automatic power-off circuit 20.

Then, the automatic power-off circuit 20 supplies electric power to the power supply circuit 3, and the control circuit 4 is supplied with and activated by electric power from the power supply line via the power supply state detecting circuit 12, the diode 14, and the automatic power-off circuit 20, thus stabilizing the voltage on the power supply line.

Thus, when the switch 7 is turned on and the electric vehicle is in the automatic power-off mode, even if the electric vehicle is running by inertia or running downhill with the battery 6 fully charged, no overvoltage is developed on the power supply line, preventing the battery 6 from being overcharged and protecting system components from an overvoltage.

The power supply state detecting circuit 12 according to the embodiment shown FIG. 5 may be any one or a combination of the power supply state detecting circuits shown in FIGS. 2 through 4. The automatic power-off circuit 20 may be arranged to automatically supply electric power to the power supply circuit 3 when it is supplied with a signal from the power supply state detecting circuit 12, even if the switch 7 is turned off.

Figure 6:
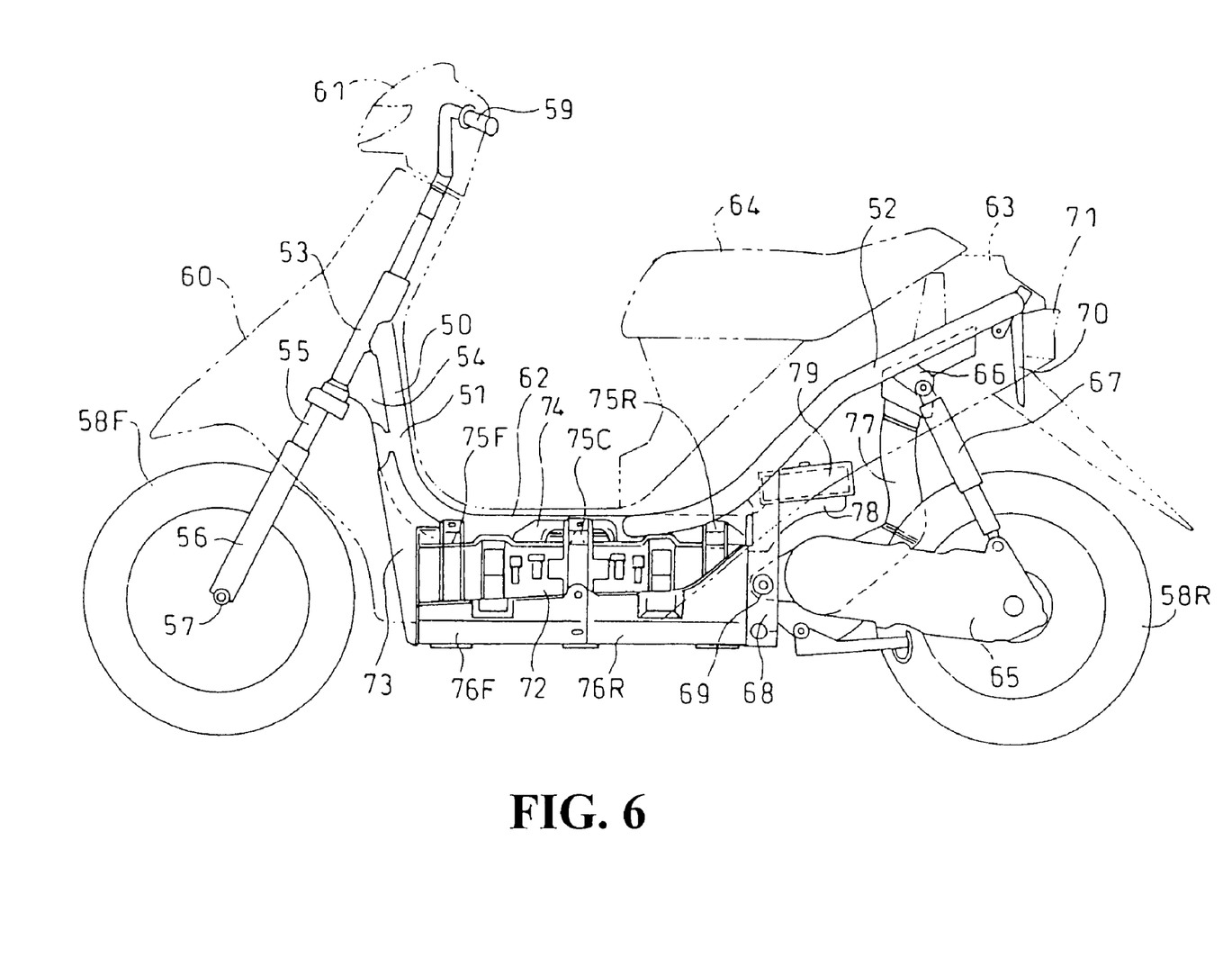
FIG. 6 is a schematic side elevational view showing by way of example a motor driven scooter to which the present invention is applicable.

FIG. 6 is a schematic side elevational view showing by way of example a motor driven scooter to which the present invention is applicable. In FIG. 6, the motor driven scooter has a body frame 50, which generally includes a main frame 51 and side frames 52 divided laterally from the main frame 51 and extending rearwardly. A head pipe 53 is coupled to a front end of the main frame 51, and reinforced by a gusset 54. A steering shaft 55 is rotatably supported by the head pipe 53, and a front fork 56 is coupled to a lower end of the steering shaft 55.

A front wheel 58F is rotatably mounted on a lower end of the front fork 56 by an axle 57. A handle 59 is mounted on an upper end of the steering shaft 55. The steering shaft 55, the front fork 56, and the handle 59 jointly make up a steering means.

The front fork 56 has an upper portion covered with a front cover 60. A handle cover 61 is mounted on an upper portion of the front cover 60. The handle 59 has grips projecting laterally from the handle cover 61.

A central cover 62 is coupled to a lower portion of the front cover 60. A body cover 63 is coupled to a rear portion of the central cover 62. A seat 64 is supported on an upper portion of the body cover 63, which covers a rear portion of the scooter body above a power unit 65. The power unit 65 includes an electric motor and a transmission mechanism which serve as a drive device.

A rear wheel 58R is supported by the power unit 65. A rear cushion 67 is attached by an upper attachment bracket 66 between the power unit 65 and the side frames 52. An attachment pipe 68 is coupled to the side frames 52, and the power unit 65 is supported on the attachment pipe 68 by a pivot shaft 69. A license plate attachment 70 and a tail lamp 71 are mounted on a rear portion of the body cover 63.

A battery unit 72 is disposed on a lower portion of the main frame 51. The battery unit 72 is supported by brackets 73, 74 and has its front, rear, and central regions secured by fastening bands 75F, 75R, 75C. The battery unit 72 has its lower portion covered with lids 76F, 76R.

The power unit 65 is cooled by air flowing through a duct tube 77, and the battery unit 72 is cooled by air flowing through a rear duct 78 and an air discharger 79.

Electric power from the battery unit 72 is supplied to an electric motor of the power unit 65 through a power supply apparatus, which is disposed in a suitable location. An output command for the power supply apparatus is outputted when a throttle grip on the handle 59 is operated.

Figure 7:
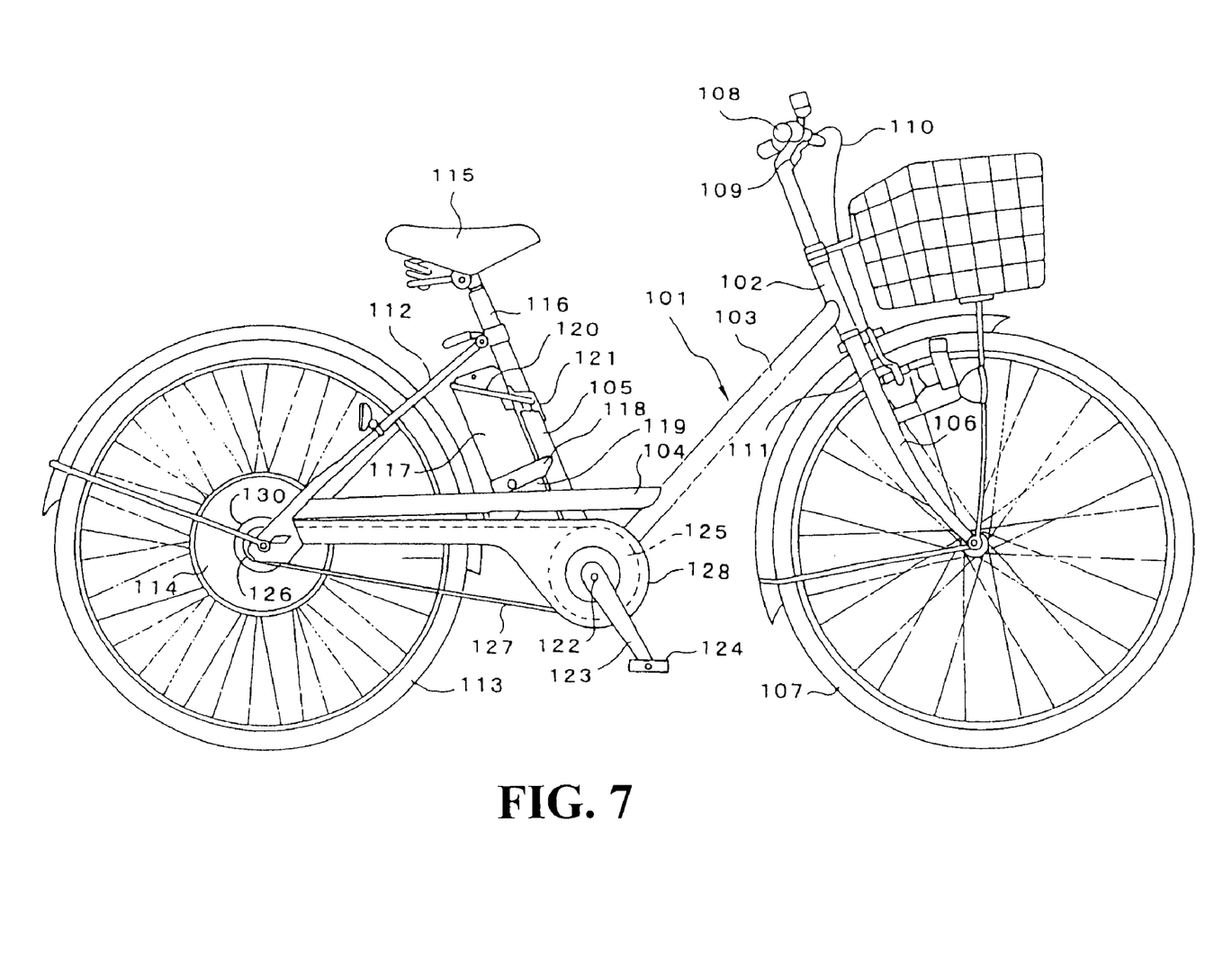
FIG. 7 is a schematic side elevational view showing by way of example a motor-assisted bicycle to which the present invention is applicable.

The present invention is also applicable to a motor-assisted bicycle which has the output command sensor 9 as a stepping force sensor. FIG. 7 is a schematic side elevational view showing by way of example a motor-assisted bicycle to which the present invention is applicable.

As shown in FIG. 7, the motor-assisted bicycle has a body frame 101 including a head pipe 102 disposed in a front position, a down pipe 103 extending downwardly from the head pipe 102, a rear fork 104 connected to and extending rearwardly from the down pipe 103, and a seat post 105 extending upwardly from a lowermost end of the down pipe 103.

A front fork 106 is angularly movably supported on the head pipe 102. A front wheel 107 is supported by an axle on a lower end of the front fork 106, and a steering handle 108 is mounted on an upper end of the front fork 106. A brake lever 109 is mounted on the steering handle 108, and a cable 110 extends from the brake lever 109 and is connected to a front wheel brake 111 fixed to the front fork 106. A rear wheel brake lever (not shown) is also mounted on the steering handle 108. The brake lever 109 is associated with a brake sensor (not shown) which detects when the brake lever 109 is operated.

A pair of laterally spaced stays 112 is coupled to an upper end of the seat post 105 and extends rearwardly and downwardly. The stays 112 are coupled near their lower ends to the rear fork 104. A cylinder 130 with a transmission incorporated therein is mounted on a rear wheel 113 and supported on a member to which the rear fork 104 and the stays 112 are joined. A motor 114 serving as an assistive power source is supported on the same member coaxially with the cylinder 130. The motor 114 includes, for example, a permanent-magnet brushless motor, which can also function as a generator.

A support shaft 116 with a seat 115 mounted on an upper end thereof is mounted on the seat post 105 vertically movably for adjusting the height of the seat 115. A battery 117 for supplying electric power to the motor 114 is disposed below the seat 115 between the seat post 105 and the rear wheel 113. The battery 117 is retained by a bracket 118 fixed to the seat post 105. The bracket 118 has a feeder 119 electrically connected to the motor 114 by electric wires (not shown) and also connected to the electrodes of the battery 117. The battery 117 has its upper portion supported on the seat post 105 by a fastener including a band 120 and a buckle 121.

A crankshaft 122 extending laterally is supported on a member where the down pipe 103 and the seat post 105 are joined across each other. Pedals 124 are connected to the crankshaft 122 by cranks 123. A drive sprocket 125 is coupled to the crankshaft 122 with a stepping force sensor (not shown) interposed therebetween. A stepping force applied to the pedals 124 is transmitted through the stepping force sensor to the drive sprocket 125. A chain 127 is trained around the drive sprocket 125 and a driven sprocket 126 which is mounted on a hub of the rear wheel 113. A stretched run of the chain 127 and the drive sprocket 125 are covered with a chain cover 128. The crankshaft 122 incorporates a rotation sensor for detecting rotation of the crankshaft 122.

Figure 8:
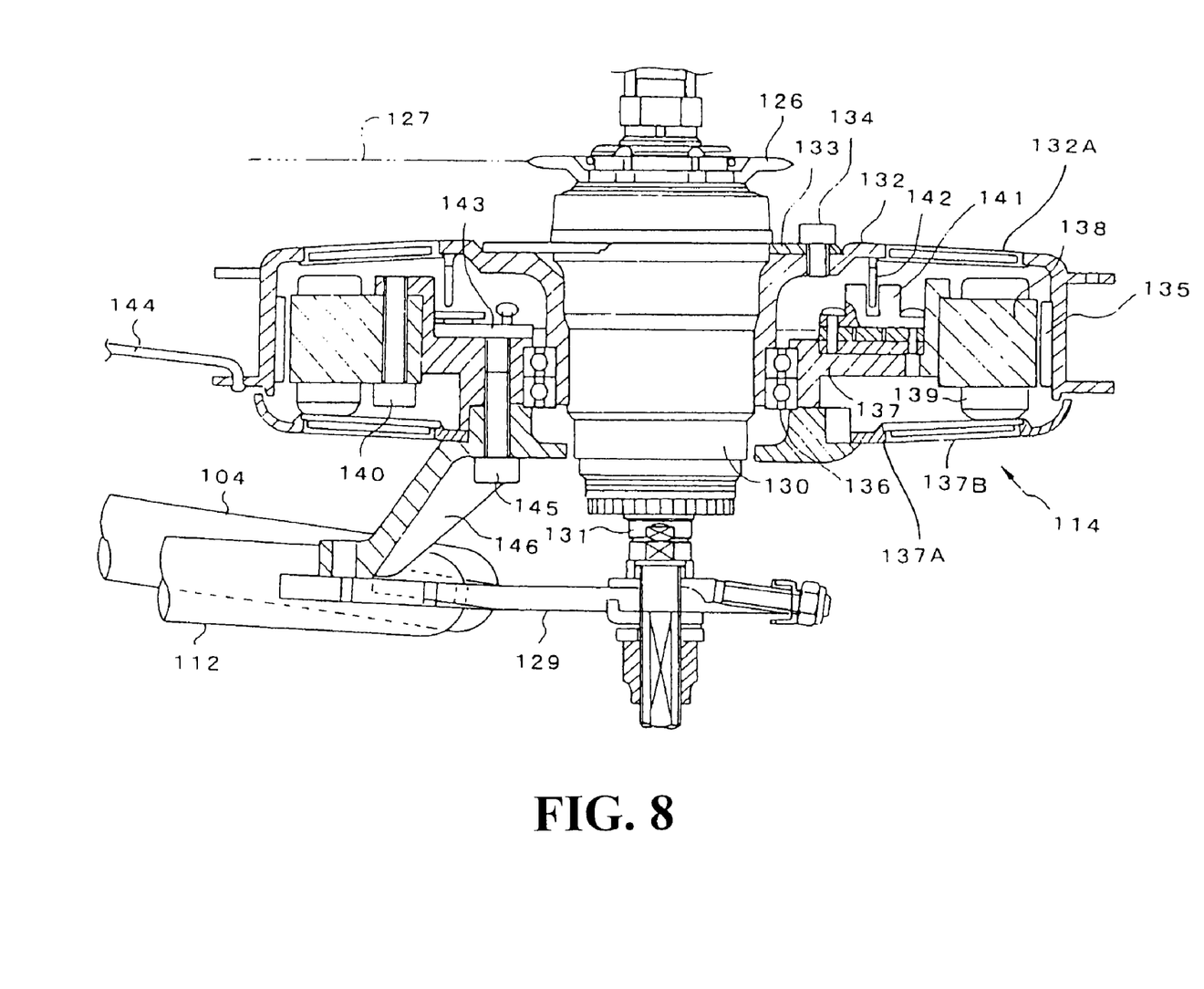
FIG. 8 is a cross-sectional view of a motor shown in FIG. 7.

FIG. 8 is a cross-sectional view of the motor 114. The cylinder 130 is supported by an axle 131 on a plate 129 which extends rearwardly from a joint between a rear end of the rear fork 104 and a lower end of the stay 112. A wheel hub 132 is fitted over the cylinder 130. The wheel hub 132 includes an annular body having an inner barrel and an outer barrel. The inner barrel has an inner circumferential surface held against the outer circumferential surface of the cylinder 130. A joint plate 133 extending from the cylinder 130 is fastened to a side of the wheel hub 132 by a bolt 134. The motor 114 has rotor poles including neodium magnets 135 disposed at spaced intervals on the inner circumferential surface of the outer barrel of the wheel hub 132. Thus, the outer barrel serves a rotor core holding the magnets 135.

A bearing 136 is fitted over the inner barrel of the wheel hub 132, and a stator support plate 137 is fitted over the bearing 136. A stator 138 is mounted on an outer circumferential surface of the stator support plate 137 and fastened thereto by bolts 140. The stator 138 is disposed with a gap defined between itself and the rotor core or the outer barrel of the wheel hub 132. Three-phase coils 139 are wound on the stator 138.

A light sensor 141 is mounted on a side of the stator support plate 137. When the wheel hub 132 rotates, a ring-shaped member 142 mounted on the wheel hub 132 intermittently blocks the light path of the light sensor 141, which then outputs a pulsed-waveform signal. The ring-shaped member 142 has a regular rectangular tooth shape for intermittently blocking the light path of the light sensor 141 upon its rotation. A positional signal indicative of the angular position of the wheel hub 132 as the rotor is detected based on the pulsed-waveform signal. There are three light sensors 141 associated with the respective phases of the motor 114, and function as magnetic pole sensors and rotation sensors of the motor 114.

A control board 143 is mounted on a side of the stator support plate 137, and controls energization of the three-phase coils 139 according to positional signals from the light sensor 141 as the magnetic pole sensors. Control elements such as a CPU, FETs, etc. are mounted on the control board 143. The control board 143 and an installation board for the light sensors 141 may be integrally combined with each other.

Spokes 144 coupled to a rim (not shown) of the rear wheel is fixed to the outer circumferential portion of the wheel hub 132. A bracket 146 is fastened by a bolt 145 to the side of the stator support plate 137 remote from the control board 143. The bracket 146 is coupled to the plate 129 of the body frame by a bolt (not shown).

The wheel hub 132 has a window in which a clear lens 132A of transparent resin is fitted. A fixed cover 137A fixed to the stator support plate 137 also has a window in which a clear lens 137B is fitted.

The three-phase brushless motor 114 is thus constructed of the stator and the rotor that are disposed coaxially with the axle 131 of the rear wheel 113, and generates assistive power to be added to manual power that is transmitted by the chain 127, the driven sprocket 126, and the cylinder 130. The motor 114 may alternatively be combined with the front wheel.

Figure 9:
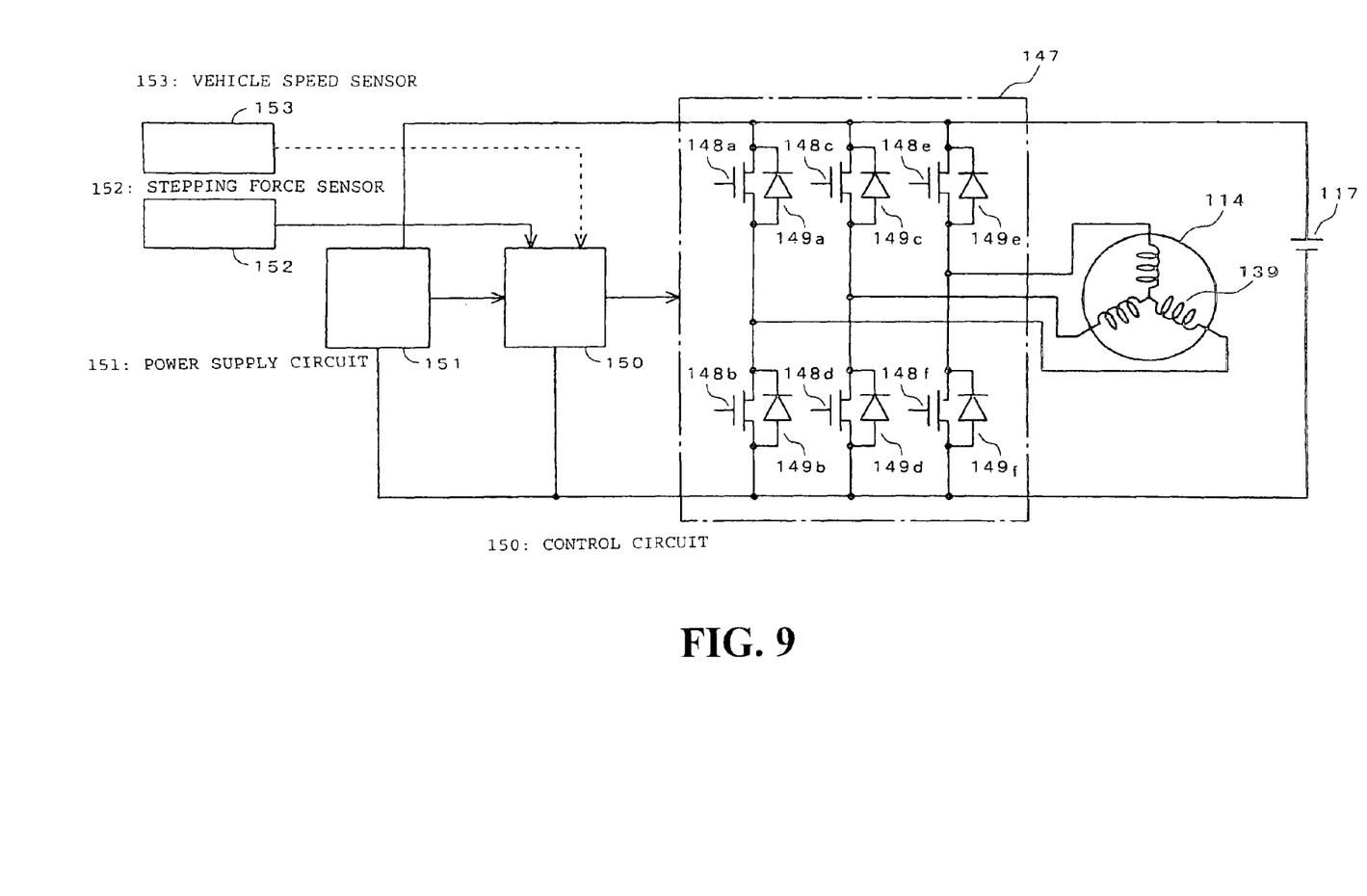
FIG. 9 is a circuit diagram of an output control circuit for the motor shown in FIG. 7.

FIG. 9 is a circuit diagram of an output control circuit for the motor 114. In FIG. 9, the motor 114 has three-phase stator coils 139, and an inverter 147 as a drive circuit has six FETs 148a through 148f and six diodes 149a through 149f which are connected to the stator coils 139. The motor 114 is powered by a battery 117 as a drive power supply.

A control circuit 150 is activated by electric power supplied through a power supply circuit 151, and is supplied with an output signal of a stepping force sensor 152 as an input signal to control energization of the FETs 148a through 148f to produce a motor drive force depending on the present stepping force. The control circuit 150 may further control energization of the FETs 148a through 148f depending on a vehicle speed detected by a vehicle speed sensor 153. Regenerated electric power which is generated across the stator coils 139 upon rotation of the rotor of the motor 114 is rectified by the commutation diodes 149a through 149f of the inverter 147, which act as rectifying diodes, and is supplied to the battery 117, thus charging the battery 117.

The present invention is not limited to the motor driven scooter and the motor-assisted bicycle shown in FIGS. 6 through 9, but is also applicable to other electric vehicles to prepare for the situation when no electric power is supplied from the battery to the control means or the battery is removed.

If electric power is supplied to the control means to activate the control means only when the voltage on the power supply line is equal to or higher than a certain value, then an energy-saving ability can be achieved. The energy-saving ability can be enhanced if the power supply state detecting circuit shown in FIG. 2 is employed which has the zener diode that is turned on for activating the control means when the voltage on the power supply line is equal to or higher than a certain value. While the brushless motor is used as the electric motor in the above embodiments, a brush motor may also be used if it has the same function in the regenerative mode.

According to the present invention, as can be seen from the above description, the voltage on the power supply line, which is generated by the electric motor, can be stabilized even when no electric power is supplied from the motor or the battery is removed, thus preventing the battery from being overcharged, preventing an overvoltage from being generated, and protecting system components from an overvoltage.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A power supply apparatus in an electric vehicle, comprising:
   drive means for energizing an electric motor;
   control means for controlling said drive means;
   a switch for connecting a battery to the control means,
   an activating unit for activating said control means depending on a voltage value on a power supply line of said electric motor; and
   voltage stabilizing means for stabilizing a voltage on said power supply line according to an instruction from said control means,
   and when the switch is open and the battery is not connected to said control means, said control means is activated by regenerative electric power of the motor in order to instruct said voltage stabilizing means.

2. The power supply apparatus in an electric vehicle according to claim 1, wherein said voltage stabilizing means comprises a regenerative resistor disposed between said power supply line and a ground line with a relay connected thereto, and said control means controls the opening and closing of said relay to stabilize the voltage on said power supply line.

3. The power supply apparatus in an electric vehicle according to claim 1, wherein said voltage stabilizing means comprises said drive means, and said control means controls said drive means to stabilize the voltage on said power supply line.

4. The power supply apparatus in an electric vehicle according to claim 1, wherein the activating unit is a power supply state detecting circuit.

5. The power supply apparatus in an electric vehicle according to claim 4, wherein the power state supply detecting circuit includes a zener diode that is turned on for activating the control means when the voltage on the power supply line is equal to or higher than a certain voltage.

6. The power supply apparatus in an electric vehicle according to claim 4, wherein the power state supply detecting circuit is a battery overvoltage detecting circuit for preventing an overvoltage on the power supply line and for preventing the battery of the vehicle from being overcharged.

7. The power supply apparatus in an electric vehicle according to claim 4, wherein the power state supply detecting circuit is a battery full-charge detecting circuit for detecting a fully charged state of the battery of the vehicle.

8. The power supply apparatus in an electric vehicle according to claim 1, wherein the activating unit activates said control means for stabilizing the voltage on the power supply line and preventing the battery of the vehicle from being overcharged when an overvoltage on said power supply line, even when a switch for supplying power to a motor of the vehicle is intentionally turned off.

9. The power supply apparatus in an electric vehicle according to claim 1, wherein the activating unit activates said control means for stabilizing the voltage on the power supply line even when the battery of the vehicle is removed.

10. The power supply apparatus in an electric vehicle according to claim 3, wherein the voltage on the power supply line is stabilized by reducing currents of FETs of the drive means to weaken a magnetic field of a motor of the vehicle, thereby reducing an amount of electric power generated thereby.

11. A power supply apparatus according to claim 1, further comprising:

automatic power-off means for supplying power to activate the control means only when the voltage on the power supply line is equal to or higher than a certain value.

12. The power supply apparatus in an electric vehicle according to claim 11, wherein said voltage stabilizing means comprises a regenerative resistor disposed between said power supply line and a ground line with a relay connected thereto, and said control means controls the opening and closing of said relay to stabilize the voltage on said power supply line.

13. The power supply apparatus in an electric vehicle according to claim 11, wherein said voltage stabilizing means comprises said drive means, and said control means controls said drive means to stabilize the voltage on said power supply line.

14. The power supply apparatus in an electric vehicle according to claim 11, wherein the activating unit is a power supply state detecting circuit.

15. The power supply apparatus in an electric vehicle according to claim 14, wherein the power state supply detecting circuit includes a zener diode that is turned on for activating the control means when the voltage on the power supply line is equal to or higher than a certain voltage.

16. The power supply apparatus in an electric vehicle according to claim 14, wherein the power state supply detecting circuit is a battery overvoltage detecting circuit for preventing an overvoltage on the power supply line and for preventing the battery of the vehicle from being overcharged.

17. The power supply apparatus in an electric vehicle according to claim 14, wherein the power state supply detecting circuit is a battery full-charge detecting circuit for detecting a fully charged state of the battery of the vehicle.

18. The power supply apparatus in an electric vehicle according to claim 11, wherein the activating unit activates said control means for stabilizing the voltage on the power supply line and preventing the battery of the vehicle from being overcharged when an overvoltage on said power supply line, even when a switch for supplying power to a motor of the vehicle is intentionally turned off.

19. The power supply apparatus in an electric vehicle according to claim 11, wherein the activating unit activates said control means for stabilizing the voltage on the power supply line even when the battery of the vehicle is removed.

20. The power supply apparatus in an electric vehicle according to claim 13, wherein the voltage on the power supply line is stabilized by reducing currents of FETs of the drive means to weaken a magnetic field of a motor of the vehicle, thereby reducing an amount of electric power generated thereby.

* * * * *